April 26, 1966   C. R. WILES ET AL   3,248,461
METHOD FOR CONTINUOUS PRODUCTION OF FOAMED PLASTIC OBJECTS
Original Filed Sept. 1, 1961

INVENTORS.
Charles R. Wiles
Kenneth R. Hilton
BY
Robert B. Ingraham
AGENT

United States Patent Office 3,248,461
Patented Apr. 26, 1966

3,248,461
METHOD FOR CONTINUOUS PRODUCTION OF FOAMED PLASTIC OBJECTS
Charles R. Wiles, Midland, and Kenneth R. Hilton, Harrison, Mich., assignors to The Dow Chemical Company, Midland, Mich., a corporation of Delaware
Original application Sept. 1, 1961, Ser. No. 135,494, now Patent No. 3,196,484, dated July 27, 1965. Divided and this application July 29, 1963, Ser. No. 298,092
7 Claims. (Cl. 264—45)

This application is a divisional application of our copending application Serial No. 135,494, filed September 1, 1961, now United States Letters Patent 3,196,484.

This invention relates to an improved method and apparatus for the forming of expanded thermoplastic resinous articles. It more particularly relates to a method and apparatus for the continuous forming of particulate expandable thermoplastic material into foamed plastic objects.

Foam plastic bodies are prepared in a variety of manners among which is a method comprising heating an unfoamed or partially foamed particulate mass of organic thermoplastic resinous material confined within a mold to expand the material and cause it to knit together into a coherent unitary object. Various methods are employed to form such bodies as the methods described in United States Patents 2,787,809 and 2,744,291, wherein a particulate mass confined in a mold is immersed in a hot liquid.

Employing these techniques, it is necessary to form each foamed plastic body by what amounts to a repetitive step. Such a step involves employing two mating mold halves, placing an expandable material within the mold cavity, heating the particulate material to expand, fill the mold cavity, and knit together to form a unitary object, subsequently the molded foam objects are cooled, the mold opened, and the part removed. Thus, for each object formed, two mold halves are employed and the entire mold assembly must be heated and cooled.

It is an object of this invention to provide a continuous method of forming expandable particulate thermoplastic material into a plurality of identical objects.

It is a further object of this invention to provide a method and apparatus for the continuous molding of foamed thermoplastic objects from particulate expandable thermoplastic resinous material.

It is still another object of this invention to provide an apparatus for the continuous molding of foamed thermoplastic objects employing molds which form one face of an object and serve to shape the opposite face of a like object.

In accordance with the method of the invention, these objects and other advantages may be attained by providing a first mold having a desired configuration, placing within said desired configuration a quantity of resinous thermoplastic expandable material, placing adjacent said first mold a second mold having a desired configuration, confining said expandable thermoplastic material by means of said first and second molds, adding expandable thermoplastic material to the configuration of said second mold and confining the material therein with a third mold continually sequentially heating said molds and contents thereof to a temperature sufficient to expand the particulate thermoplastic material, sequentially cooling said molds and removing the formed foamed thermoplastic objects therefrom.

Also within the scope of the invention is an apparatus for continuously forming foamed thermoplastic objects, said apparatus comprising in cooperative combination a plurality of molds, a housing defining a passageway adapted to receive said molds, said passageway having at least two portions, a heating portion and a cooling portion, said molds being so constructed and arranged that on being placed adjacent to each other in a configuration which may be forced through said passageway a cavity is defined between each of said molds having shape of the object desired to be formed.

Further features and additional advantages and benefits of the present invention will be more fully manifest in the ensuing description and specification, taken in connection with the accompanying drawing wherein.

Figure 1:
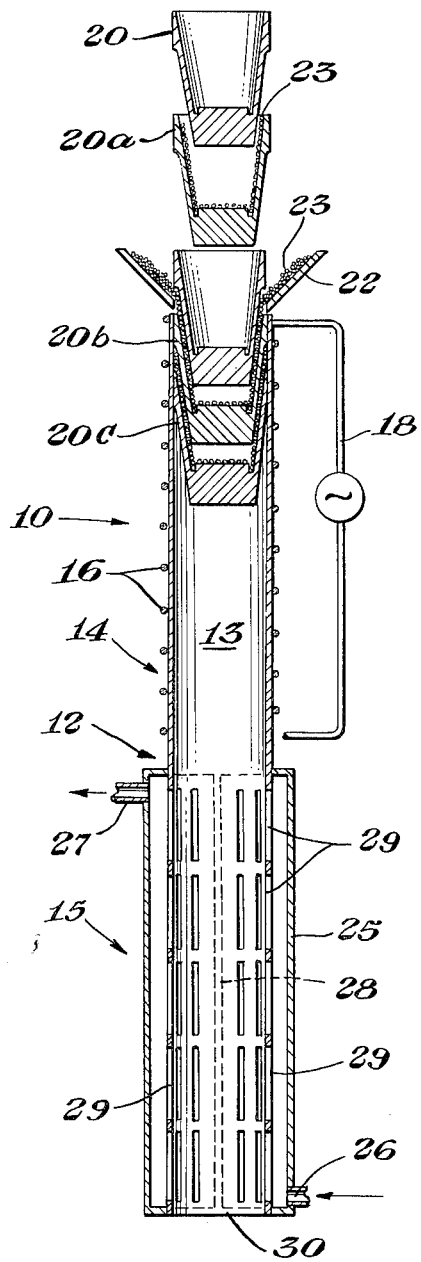
FIGURE 1 is a schematic sectional view of an apparatus in accordance with the invention and illustrating the method thereof.

In FIGURE 1 there is illustrated a schematic cross sectional view of an apparatus in accordance with the invention generally designated by the reference numeral 10. The apparatus 10 comprises a conduit 12 defining a passageway 13. The conduit 12 is comprised of a heating section 14 and a cooling section 15. The heating section 14 is wrapped with an electrical conductor 16 connected to a source of alternating current 18. A plurality of molds 20 are provided which slidably engage the inner surfaces of the passageway 12. A hopper 22 is provided adjacent the uppermost portion of the heating section 14 which also is adapted to slidably engage the molds 20. The mold 20a contains on its inner surface a particulate foamable thermoplastic resin 23. A portion of the resin 23 is also disposed within the hopper 22. The resinous material 23 is contained between the molds 20b and 20c and expanded, substantially filling the void between the molds. The conduit portion 15 is provided with a cooling jacket 25 which is equipped with an inlet 26 and an outlet 27. The space between the conduit portion 15 and the jacket 25 is divided into two portions by diametrically opposed dividers 28 (one shown). A plurality of openings 29 provide communication between passageway 13 and the interior of jacket 25. The cooling portion 15 of the conduit 12 terminates in a mold exit 30.

Figure 2:
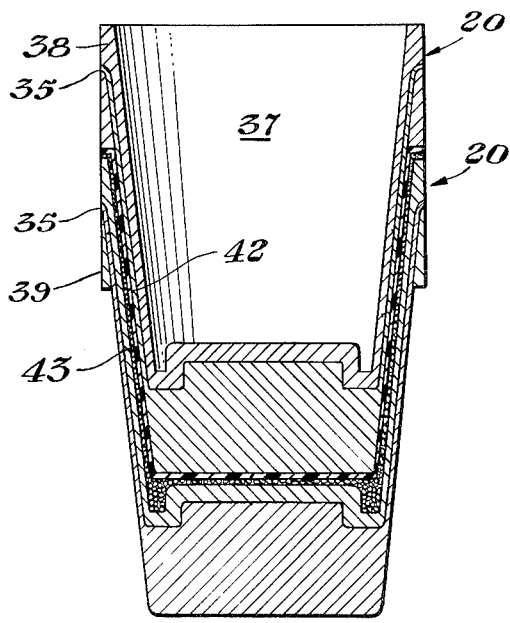
FIGURE 2 is an enlarged representation of a plurality of molds within the apparatus of FIGURE 1.

In FIGURE 2 there is illustrated a schematic cross sectional view of a mating pair of molds, so nested in accordance with the invention as they would appear toward the terminal portion of the heating section 14 of the apparatus of FIGURE 1. The molds 20 are comprised of a magnetic ferrous metal such as iron or steel body section 35 defining a cavity 37, the inner wall of body portion 35 is provided with a non-magnetic conductive liner 38, prepared from metals such as aluminum, copper, and the like, and adjacent the rim of the body portion 35 is a non-magnetic conductive metal sleeve 39. Disposed between adjacent molds 20 is a thin plastic film liner 42. Surrounding the liner 42 and within the cavity 37 of the mold 20 is a unitary foamed plastic body 43.

Figure 3:
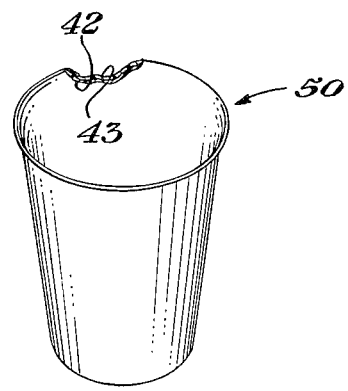
FIGURE 3 shows an object formed from expandable thermoplastic resinous material in accordance with the invention.

FIGURE 3 shows a cutaway view of cup 50 formed in accordance with the invention. The cup 50 comprises a foamed portion 43 rigidly adhere to a liner 42.

In operation of the illustrated embodiment of the invention, the walls of the mold 20 defining the cavity 37 are treated with an adhesive to provide uniform distribution of particulate expandable material. A particulate thermoplastic mass 23 is introduced into the mold in such a manner that the walls thereof are uniformly covered with the expandable particulate plastic. A preformed thin thermoplastic cup liner such as the liner 42 is positioned on the mold 20 opposite the side carrying the expandable thermoplastic material 23. A series of such molds are introduced into the apparatus 10 through the hopper 22 wherein additional granular thermoplastic material 23 is provided to fill the space between adjacent molds. Alternating current is provided to the winding 16 which induces a current in the molds 20. The heating of the molds 20 causes the expandable thermoplastic material between adjacent molds to expand and knit together into a unitary body and bond to the liner 42. The molds 20 are advanced through the heating portion 14 into cooling portion 15 where the heat added to the mold 20 by the induction heater is removed and the thermoplastic material between adjacent molds solidified into a unitary shaped cup 50. A cooling medium such as water or air flows into inlet 27 through the opening 29 across the molds 20 within the cooling portion 15 into the jacket and out through outlet 26.

The cups 50 are readily removed from the molds 20 which subsequently can be recycled through the apparatus in a similar manner to provide additional cups. Thus, continuous operation is possible by inserting suitably filled molds into the heating section; continually forcing a column of molds through the apparatus foaming the expandable plastic material and subsequently cooling it to prepare the desired objects. Although the molds illustrated have the form of a cup, a wide variety of other configurations may be utilized, such as soap dishes, baskets, boxes and the like. Such shapes are readily formed employing mating molds. More intricate shapes are readily fabricated by employing inserts having appropriate dimensions.

Molds for the practice of the present invention are advantageously prepared in accordance with the teaching of United States Patent 2,181,874, wherein induction heater construction and the principles of heating and distributing the heat in a bimetallic body are set forth. Other heating means are readily employed in the practice of the invention such as steam, resistance heating, and the like.

The heating means chosen for a particular embodiment will primarily be dependent on the power sources available and the particular configuration of the object desired. For example, in the continuous manufacture of foam plastic toroids, advantageously, steam, hot gas or liquid circulated throughout a plurality of symmetrical perforated molds is employed. Generally, when employing a liquid as a heating medium for the molds and circulating it through the passageway 13, it is generally beneficial to use the heating section on the bottom and move the molds in an upward direction. Alternately, when steam is employed, often it is advantageous to position the conduit 12 in a horizontal direction and provide openings intermediate between heating section 14 and the cooling section 15 to provide for the escape of condensate.

Typical expandable particulate material which may be employed in the practice of the invention is described in United States Patents 2,744,291 and 2,787,809. Commercially, the most popular of the materials described in these patents are polystyrene beads having a volatile liquid entrapped within, such as pentane or low boiling fluorohalocarbons.

When thin objects such as cups are prepared, it is advantageous to provide a means of distributing a particulate foamable material uniformly over one and sometimes two surfaces of the mold. This is readily achieved by applying an adhesive to the surface or surfaces of the mold where it is desired to position the expandable material. Suitable adhesives often comprise aqueous starch solutions, solutions of gum agar, sugar solutions, and frequently sufficient adhesion and distribution may be attained by wetting the surfaces of the mold with an aqueous solution of detergent or glycerine. When water soluble adhesives are employed, they are readily rinsed from the surface of the formed plastic object.

By way of further illustration, a plurality of molds were constructed substantially as shown in FIGURE 2 employing low carbon steel and aluminum having a diameter of about 3 inches and designed to form a cup about 3¼ inches long and about 2 inches in diameter at the base. An apparatus comprised a 20 inch long passageway; a 10 inch portion of one end was wound with 58 turns of ¼ inch (nominal) copper tubing having attached thereto a water supply. The coil of copper tubing was connected to a power source which delivered to the coil about 300 amperes at 6 volts, 60 cycles alternating current. The remaining 10 inches of the apparatus was jacketed with a water jacket and provided with means to introduce water into the passageway to assist in cooling the molds. The molds were so constructed and arranged to produce a cup which was identical in size with a cup produced by conventional molding techniques. The female portion of the mold was sprayed with about ¾ of a gram of an aqueous solution consisting of about 50 percent commercial (Karo) corn syrup and about ½ percent of a nonionic detergent commercially available under the trade name Joy. This solution was uniformly spread over the mold surface. The cavity was subsequently filled with partly foamed polystyrene beads passing through a 22 mesh screen and retained on a 40 mesh screen. Excess beads were poured out of the cavity and a uniform layer of beads remained coating the female surface. A cup liner was vacuum formed from a 2 mil thick polystyrene sheet and was placed over the male portion of the mating mold. The liner on the male portion was placed against the surface presented by the partly expanded beads adhered to the female portion of the mold and the assembled molds placed in one end of the heating passageway. Similar sets of molds were coated with partly expanded polystyrene beads and liners and inserted into the heating passageway forcing the molds already in the passageway toward the cooling section. When the passageway was completely filled with molds, those issuing from the opposite end of the passageway were removed and opened. Well formed cups were obtained weighing about 2 grams. The foamed polystyrene was integrally bonded to the polystyrene liner. By way of contrast, cups formed by the molding of expandable particulate polystyrene by the methods of the prior art weighed 5 grams. Cups formed in accordance with the prior art when tested occasionally showed a tendency toward leakage. No tendency to leak was observed in the cups in accordance with the invention. In a similar manner, other expandable particulate polymeric compositions are readily shaped into a wire variety of articles including cups, discs, trays, boxes, stoppers, bungs and ornamental configurations.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. Method of forming a plurality of foamed unitary thermoplastic resinous objects comprising providing a first mold having a desired configuration placing within said desired configuration a quantity of resinous thermoplastic expandable material, placing adjacent said first mold a second mold, having a desired configuration and confining said expandable thermoplastic material by means of said first and second molds, adding expandable thermoplastic material to the configuration of said second mold confining the material therein with a third mold having a desired configuration continually sequentially heating said molds and contents thereof to a temperature sufficient to expand the particulate thermoplastic material, sequentially cooling said molds and removing the foamed thermoplastic object therefrom.

2. Method of forming a plurality of foamed unitary polystyrene objects comprising: providing a first mold having a desired configuration, placing within said desired configuration a quantity of particulate expandable polystyrene, placing adjacent said first mold a second mold, having a desired configuration and confining said particulate expandable polystyrene by means of said first and second molds, adding particulate expandable polystyrene to the configuration of said second mold confining the material therein with a third mold having a desired configuration, continually sequentially heating molds and contents thereof to a temperaure sufficient to expand the particulate thermoplastic material, sequentially cooling said molds and removing foamed thermoplastic objects therefrom.

3. Method of continually forming a plurality of foamed polystyrene cups employing a plurality of like molds providing a first mold having a generally hollow frusto-conical configuration, placing within said hollow configuration a quantity of particulate expandable polystyrene, placing adjacent said first mold a second mold, having a configuration similar to said first mold and confining said expandable thermoplastic material by means of said first and second molds, adding particulate expandable polystyrene to the hollow configuration of said second mold confining the expandable polystyrene therein with a third mold having a configuration similar to said first mold, continually sequentially heating said molds and contents thereof to a temperature sufficient to expand the particulate polystyrene, sequentially cooling said molds and removing a foamed polystyrene cup therefrom.

4. The method of claim 3, including the step of applying an adhesive to the wall of the mold to retain said particulate material in a generally cup-like configuration.

5. The method of claim 3, wherein an unexpanded non-porous plastic cup liner is positioned between said expandable polystyrene and the adjacent mold.

6. The method of claim 1, including the step of applying an adhesive to the wall of the mold to retain said particulate material in a generally cup-like configuration.

7. The method of claim 1, wherein an unexpanded non-porous plastic cup liner is positioned between said expandable polystyrene and the adjacent mold.

References Cited by the Examiner

UNITED STATES PATENTS

| | | |
|---|---|---|
| 1,566,500 | 12/1925 | Northrup. |
| 1,689,584 | 10/1928 | Grupe _____ 264—91 |
| 2,560,491 | 7/1951 | Smith et al. _____ 264—120 XR |
| 2,787,809 | 4/1957 | Stastny _____ 264—53 |
| 2,803,046 | 8/1957 | Brennan _____ 22—75 XR |
| 2,959,829 | 11/1960 | Brennan _____ 22—75 XR |
| 2,976,577 | 3/1961 | Gould _____ 264—45 |
| 2,977,639 | 4/1961 | Barkhuff et al. _____ 264—45 |
| 3,000,058 | 9/1961 | Thielen _____ 264—45 |
| 3,068,526 | 12/1962 | Croan _____ 264—51 |
| 3,079,630 | 3/1963 | Orr _____ 264—51 |
| 3,080,267 | 3/1963 | Schmalz _____ 264—45 XR |

ALEXANDER H. BRODMERKEL, *Primary Examiner.*

ROBERT F. WHITE, *Examiner.*

P. E. ANDERSON, *Assistant Examiner.*